United States Patent Office 2,908,129
Patented Oct. 13, 1959

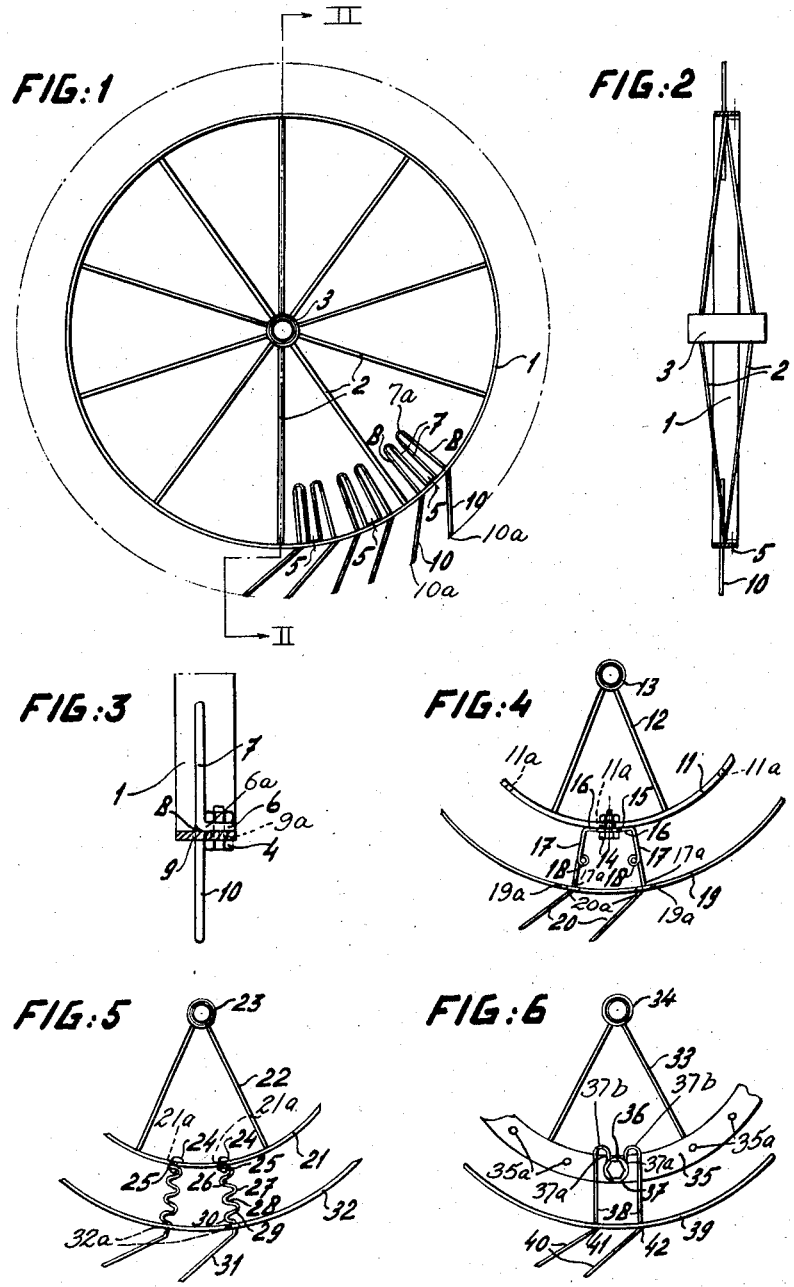

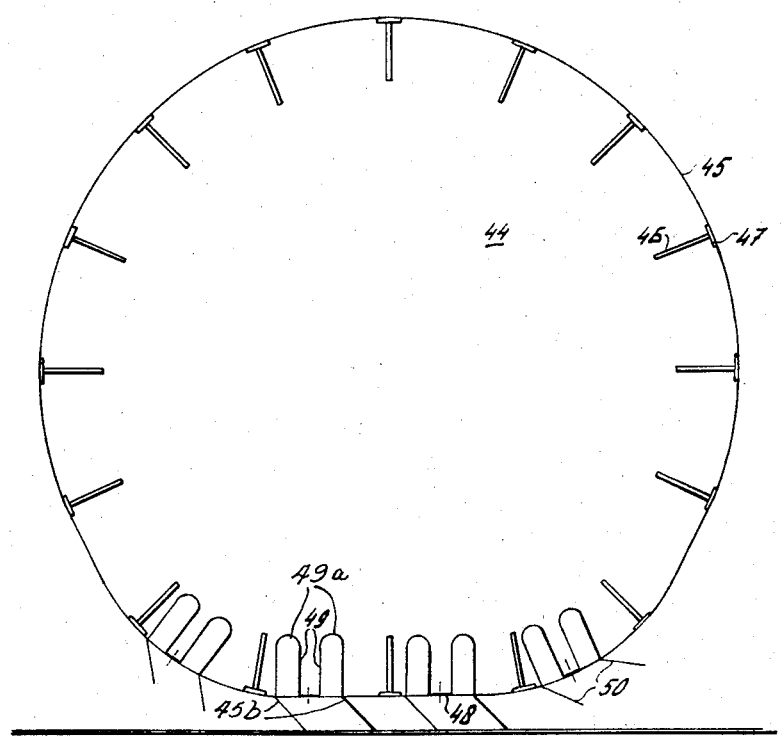
FIG: 7

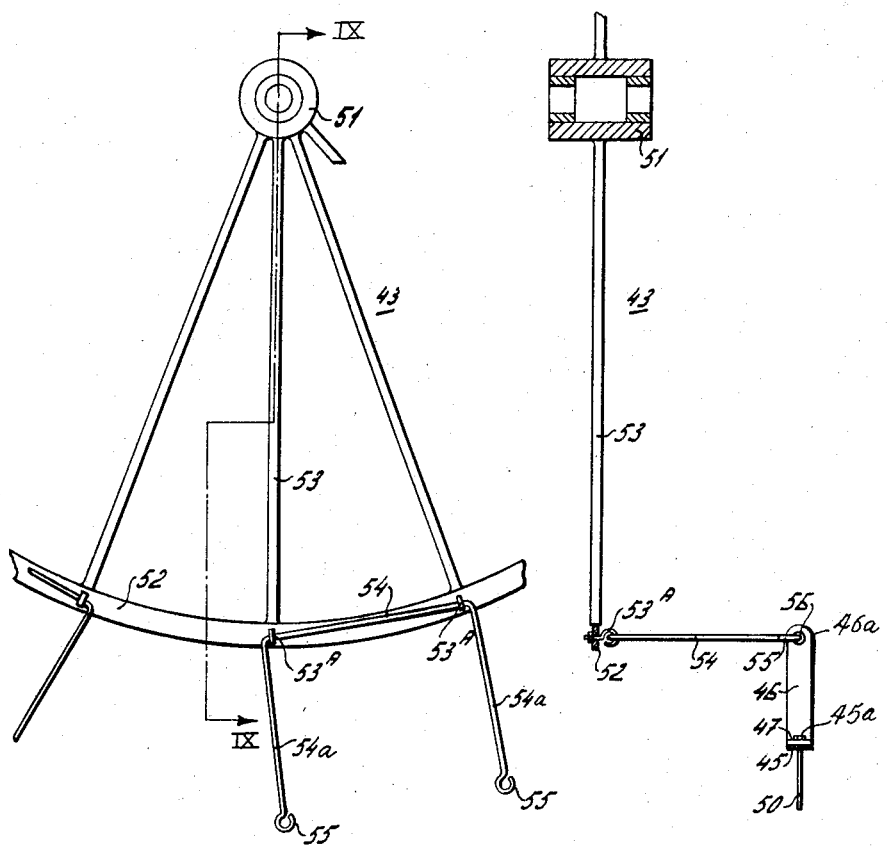

2,908,129

ROTARY RAKING WHEEL WITH PERIPHERAL TINES

Cornelis van der Lely and Ary van der Lely, Maasland, Netherlands, assignors to C. van der Lely N.V., Maasland, Netherlands, a Dutch limited-liability company of the Netherlands Application March 22, 1955, Serial No. 496,026

Claims priority, application Netherlands March 29, 1954

17 Claims. (Cl. 56—377)

This invention relates to rake wheels for laterally displacing material lying on the ground.

Rake wheels are known to have been provided with a number of resilient teeth extending with free extremities through a rim or similar stiffening ring in such a way that, upon deflection of the free extremity of a tooth, the part of the tooth situated between the rim and the support of the tooth on a wheel is elastically deformable. Such rake wheels are very useful for certain purposes.

The invention is intended to provide an improved rake wheel of the above type and, according to the invention, the length of a tooth between its rim and adjacent point of support is much greater than the linear distance between the place where the tooth extends through the rim and said point of support. By this construction, a tooth is very resilient without impeding the mobility of the rim.

The invention is next explained with reference to the annexed drawing wherein:

Fig. 1 shows a side view of a first embodiment of the invention.

Fig. 2 is a sectional view along line II—II in Fig. 1.

Fig. 3 shows an enlarged fragmentary section according to the lower part of the line II—II in Fig. 1.

Fig. 4 is a fragmentary side view of a wheel according to a second embodiment of the invention.

Fig. 5 is a fragmentary side view of a wheel in accordance with a third embodiment of the invention.

Fig. 6 is a fragmentary side view of a wheel in accordance with a fourth embodiment of the invention.

Fig. 7 shows a view of the rim of a fifth embodiment of the invention.

Fig. 8 shows a fragmentary side view of the remaining part of the rake wheel of which Fig. 7 represents the rim, said remaining part carrying the rim.

Fig. 9 shows a fragmentary section according to the line IX—IX in Fig. 8 through the rake wheel according to Figures 7 and 8.

As shown in the Figures 1–3 in the first example of embodiment of the invention, a stiffening ring or rim 1 is present which consists of a bent flat strip and is rigidly connected to a hub 3 by means of coupling means or spokes 2. A number of bolts 4 (Fig. 3) are lead through suitable openings 9a through the rim 1, the center lines of said bolts 4 being indicated at 5 in the Figures 1 and 2. These bolts 4 each clamp a U-shaped piece of steel wire 6 immovably against the rim 1. The limbs 6a of this U-shaped piece 6 merge into parts 7 which are directed radially toward hub 3. Parts 7 are connected by a bend 7a of 180° to parts 8 of the steel wire, said parts 8 being directed radially to the rim 1. These parts are inserted through openings 9 in the rim 1 and bend about 45° into teeth or free extremities 10 which protrude beyond the rim 1. The bolts 4 and openings 9 define supporting points for steel wire or tines.

When an axial force is exerted on the points or ends 10a of the teeth 10 by means of contact with the ground or the material lying thereon, each point 10a will be able to deflect considerably, as the steel wire 6, from which two teeth 10 are bent, can be subjected to torsion in parts 7 and 8. Thus, the sections of rim 1 which define openings 9 constitute supports or bearings. The holes 9 are large enough that they do not prevent rotation of extremities 10 about the longitudinal axis of associated parts 8. Said holes 9 are also preferably large enough that, upon other movements of the extremities 10, the parts 8 and 7 are influenced and are able to yield. The teeth 10, according to Figures 1–3, have an advantage in that they are exclusively related to the rim 1 and not to the hub 3 or other central part, so that this latter part can be in any required form.

The rake wheel according to Fig. 4 has a rim 11 which is rigidly connected to a hub 13 by means of spokes 12. The rim 11 is provided with a number of holes 11a regularly distributed over the circumference of the rim 11, bolts 14 passing through said holes 11a and clamping the U-shaped central part 15 of a steel wire rigidly against the rim 11. The limbs of the U merge into oppositely directed parts 16 which are connected to radial parts 17. About the middle of each part 17, one or more turns 18 of 360° are provided. The extremities 17a of the parts 17 are inserted through openings 19a in a stiff outer rim 19 situated in the same plane as the rim 11 and having a greater diameter. The extremities 20 of the steel wire extend beyond the rim 19 and make an obtuse angle with the parts 17 outside of this rim. The bends 20a cause the rim 19 to remain centered. By this construction, the rim 19 which is not coupled in any other way with the rim 11 yields readily, especially in an axial sense.

Two rims are also present in the construction according to Fig. 5. The inner rim 21 is rigidly connected to the hub 23 by means of spokes 22. The inner rim 21 is provided with holes 21a through which bolts 24 are disposed. Each bolt 24 clamps an eyelet 25, bent from the extremity of a steel wire, immovably against the rim 21. Bends 26—30 of about 180° are formed in each wire. The free extremity 31 of each steel wire is put through an opening 32a in the outer rim 32 and forms an angle with the radial direction at the associated opening 32a by which the rim 32 is kept in its place.

According to Fig. 6, a rake wheel consists of an inner rim 35 rigidly connected to a hub 34 by means of spokes 33, said inner rim 35 having the shape of a flat ring 35 against which the steel wires 37, 38, 40 constituting the teeth are clamped by means of bolts 36 inserted into the ring through holes 35a. The clamped U-shaped central part 37 is situated in a plane at right angles to the axle of the rake wheel. The limbs 37a of the U extend radially to the inside and merge via turns 37b of 180° into parts 38 extending through an outer rim 39. Only the extremities of the steel wire extend beyond the rim, said extremities being bent at 41 and 42 in the same direction so that the rim 39 cannot be separated from the teeth.

In the embodiment of the rake wheel according to the invention shown in Figures 7–9, the wheel is provided with a part 43 (Figs. 8 and 9) supported on an axle of rotation, and a part 44 (Fig. 7) connected with said part 43 by means of flexible elements 54. The part 44 consists of a flexible ring-shaped steel hoop 45 on which strips 46, which are directed radially inwards, are fixed by means of feet 47 which each are drawn against the hoop 45 by two bolts 45a (Fig. 9). Between two successive feet at 48, a connecting member for the middle part of steel wire 49, resting against the inside of the hoop and bent in the shape of a U, is lead through a hole in the steel hoop. The limbs of the U-shaped portion 49 change direction according to bends 49a of 180° into wire parts directed outwards in a substantially radial direction and inserted through holes 45b in the hoop 45. Only the catching means 50 which are constituted by the extremities of the steel wire extend outside this hoop 45.

The wheel portion 43 consists of a hub 51 and a rim 52 connected as one rigid piece by means of spokes 53. The rim 52 carries near each spoke 53 an eyelet 53A. Eyelets 53A carry in pairs U-shaped bows 54 of steel wire. Eyelets 55 are bent from the extremities of the limbs 54a of the steel wire 54 which eyelets 55 extend through holes 56 and engage the inner ends 46a of the strips 46 of the wheel portion 44.

It is clear that, by the special fastening with the elastic and rotatable bows 54, the hoop 45 can yield in a radial direction with regard to the rim 52 and the hub 51. Thus, the hoop 45 may flatten at the lower side over a considerable length so that a large number of catching means 50 can touch the ground at the same time and consequently the rake wheel has a large working width.

There will now be obvious to those skilled in the art many modifications and variations of the structures set forth. These modifications and variations will not, however, depart from the spirit of the invention as defined in the following claims.

What we claim is:

1. A rake wheel for laterally displacing material lying on the ground comprising: a hub, a rimlike stiffening ring, coupling means coupling said stiffening ring to said hub, a plurality of elongated teeth each having one free and one fastened extremity, a said ring being provided with a plurality of apertures forming, in said ring, bearings operatively associated with said stiffening ring, said teeth being supported by and extending through said bearings, whereby the parts of the teeth with the free extremities are outside the stiffening ring and the parts of the teeth with the fastened extremities are inside the said stiffening ring, the fastened extremities being connected to the wheel at points which are at most as far from the axis of rotation of the rake as the bearings for the teeth, the developed length of each tooth between the fastened extremity and the bearing of the tooth being substantially longer than the length of a straight line joining said extremity and said bearing.

2. A rake wheel as claimed in claim 1, in which the stiffening ring includes fastening means for the fastening of the fastened extremities of the teeth.

3. A rake wheel as claimed in claim 2, in which each tooth between its bearing on said stiffening ring and its fastened extremity is substantially U-shaped.

4. A rake wheel as claimed in claim 2, in which the stiffening ring consists of a flexible steel hoop, the couping means for coupling said stiffening ring to the hub being resilient and the fastening means for each tooth being in the proximity of the bearing for the corresponding tooth.

5. A rake wheel as claimed in claim 1, in which the distance of the fastened extremities of the teeth to the axis of rotation of the rake wheel is substantially smaller than the radius of the stiffening ring.

6. A rake wheel as claimed in claim 5, in which each tooth between its bearing on the stiffening ring and its fastened extremity includes at least one helicoidal turn.

7. A rake wheel as claimed in claim 5, in which each tooth between its bearing on the stiffening ring and its fastened extremity includes at least one flat bend.

8. A rake wheel as claimed in claim 5, comprising a second stiffening ring, the fastened extremities of the teeth being fastened to said second stiffening ring.

9. A rake wheel as claimed in claim 1, in which the free extremity of each tooth makes an angle with the radial direction.

10. A rake wheel as claimed in claim 1, in which each tooth consists of a piece of steel wire having a circular cross section.

11. A rake wheel for displacing material lying on the ground comprising a hub, a rimlike member attached to said hub and provided with spaced openings, a plurality of resilient tines spaced in entirety from said hub, each tine including an outwardly extending part extending through one of said openings and to the outside of said rimlike member and an inwardly extending part extending to the inside of said rimlike member substantially in the direction of said hub, said outwardly extending part making an angle with a radial direction determined by said rimlike member, each tine being supported in two of said openings which form bearings in said rimlike member in which said tines can rotate, the inwardly extending part of each tine being deformable by rotation of each tine in its bearing, each of said deformable parts including at least one bend and having a developed length substantially longer than the distance between adjacent bearings.

12. A rake wheel as claimed in claim 11, in which the inwardly extending part is substantially in the shape of a U.

13. A rake wheel as claimed in claim 11, in which the rake wheel is provided with two rimlike members, the inwardly extending parts being supported by both of these members.

14. A rake wheel as claimed in claim 13, in which one of said rimlike members is located at the inside of the other of said rimlike members.

15. A rake wheel as claimed in claim 14, in which each inwardly extending part is attached to the inner rimlike member by means of a radially directed pin.

16. A rake wheel as claimed in claim 11, in which two rimlike members are provided, said members being connected in axially spaced relation.

17. A rake wheel as claimed in claim 11, in which the rimlike member is constituted by a resilient steel hoop, said hoop being attached to said hub for deviation in radial direction, each tine being attached to said hoop in close proximity to the opening through which it extends.

References Cited in the file of this patent

UNITED STATES PATENTS

| 2,652,679 | Krause | Sept. 22, 1953 |
| 2,670,588 | Plant | Mar. 2, 1954 |
| 2,722,799 | Cooley | Nov. 8, 1955 |

FOREIGN PATENTS

| 674,797 | Great Britain | July 2, 1952 |